(12) United States Patent
Goldstein (10) Patent No.: US 12,556,541 B2
(45) Date of Patent: Feb. 17, 2026

(54) SYSTEM AND METHOD FOR DISTRIBUTING MULTIFACTOR AUTHENTICATION DATA TO TRUSTED PARTIES

(71) Applicant: Kevin Goldstein, Tucson, AZ (US)

(72) Inventor: Kevin Goldstein, Tucson, AZ (US)

( * ) Notice: Subject to any disclaimer, the term of this patent is extended or adjusted under 35 U.S.C. 154(b) by 306 days.

(21) Appl. No.: 18/210,848

(22) Filed: Jun. 16, 2023

(65) Prior Publication Data

US 2023/0412610 A1    Dec. 21, 2023

Related U.S. Application Data

(60) Provisional application No. 63/352,681, filed on Jun. 16, 2022.

(51) Int. Cl.
*H04L 9/40* (2022.01)
*G06Q 20/08* (2012.01)

(52) U.S. Cl.
CPC ........ *H04L 63/104* (2013.01); *H04L 63/0838* (2013.01); *G06Q 20/085* (2013.01)

(58) Field of Classification Search
CPC .............. H04L 63/104; H04L 63/0838; G06Q 20/085; G06Q 20/40
See application file for complete search history.

(56) References Cited

U.S. PATENT DOCUMENTS

| | | | | |
|---|---|---|---|---|
| 9,876,796 B2 * | 1/2018 | Egan | ........................ | H04L 63/20 |
| 10,067,839 B1 * | 9/2018 | Bertz | .................. | G06F 11/1456 |
| 2005/0113123 A1 * | 5/2005 | Torvinen | ................ | H04L 67/303 |
| | | | | 455/518 |
| 2006/0019634 A1 * | 1/2006 | Hawkes | ................. | H04W 12/06 |
| | | | | 455/411 |
| 2008/0235353 A1 * | 9/2008 | Cheever | .................. | G06Q 30/02 |
| | | | | 709/219 |
| 2009/0106138 A1 * | 4/2009 | Smith | ..................... | G06Q 40/00 |
| | | | | 705/35 |

(Continued)

FOREIGN PATENT DOCUMENTS

| | | | | | |
|---|---|---|---|---|---|
| KR | 20060014738 A | * | 2/2006 | ............. | H04W 4/12 |
| WO | WO-2018042321 A1 | * | 3/2018 | ............. | H04L 9/088 |
| WO | WO-2018193469 A1 | * | 10/2018 | ............. | G06F 15/76 |

*Primary Examiner* — Khalid M Almaghayreh (74) *Attorney, Agent, or Firm* — The Rapacke Law Group; Andrew Rapacke; Kenneth Brooks (57) ABSTRACT

Systems, methods, and other aspects for distributing multi-factor authentication data to trusted parties are disclosed. A system phone number is assigned to a primary user. A group is created, and the primary user and the system phone number are associated with the group. The primary user causes the system to send invitations to the trusted parties to join the group. The invitations provide links, means, and/or instructions to join the group. The system phone number is used to enroll or register in an account that uses a single sign-on credential requiring two-factor authentication. When the primary user or any trusted users attempts to access the account, the two-factor/multifactor authentication information is sent to the system phone number and is accessible to the primary user and other users through the application (for example, via SMS or push notification), allowing the primary user and the other users to access the account.

20 Claims, 5 Drawing Sheets

(56) References Cited

U.S. PATENT DOCUMENTS

| | | | |
|---|---|---|---|
| 2010/0144315 A1* | 6/2010 | Jayasuriya | H04M 1/663 455/411 |
| 2012/0054280 A1* | 3/2012 | Shah | G06F 9/5072 709/205 |
| 2014/0200963 A1* | 7/2014 | Abhyanker | H04L 67/52 705/7.34 |
| 2014/0324993 A1* | 10/2014 | Li | H04L 12/1818 709/206 |
| 2016/0306963 A1* | 10/2016 | Austin | G06F 21/53 |
| 2018/0089411 A1* | 3/2018 | Chakraborty | G06F 21/40 |
| 2019/0205520 A1* | 7/2019 | Chakraborty | G06F 21/40 |
| 2019/0297075 A1* | 9/2019 | Kaladgi | G06F 21/34 |
| 2020/0210904 A1* | 7/2020 | Skeen | G06Q 30/0643 |
| 2021/0234905 A1* | 7/2021 | Shi | H04N 21/4524 |
| 2022/0303266 A1* | 9/2022 | Goodsitt | H04M 3/51 |
| 2023/0119383 A1* | 4/2023 | Kruszewski | G06N 5/01 705/6 |
| 2023/0196349 A1* | 6/2023 | Ridzuan Bin Ma Arof | G06Q 20/40145 705/44 |

* cited by examiner

SYSTEM AND METHOD FOR DISTRIBUTING MULTIFACTOR AUTHENTICATION DATA TO TRUSTED PARTIES

CROSS-REFERENCE TO RELATED APPLICATIONS

The present application claims priority to U.S. Provisional Application No. 63/352,681 filed Jun. 16, 2022, titled "SYSTEM AND METHOD FOR DISTRIBUTING MULTIFACTOR AUTHENTICATION DATA TO TRUSTED PARTIES" which is hereby incorporated by reference in its entirety.

FIELD

The present disclosure relates to systems and methods for distributing multifactor authentication data to trusted parties, and more particularly to systems and methods that associate a primary user and trusted parties with a group phone number such that multifactor authentication data is shared by the primary user and the trusted parties.

BACKGROUND

This section provides background information related to the present disclosure which is not necessarily prior art.

There are many methods for securing accounts using two-factor authentication or multifactor authentication (2FA and MFA). Some of these methods require the system to send an SMS message or email with a one-time password (OTP) to limit access to accounts that are set up with only a single login credential (i.e., there are not multiple usernames that access a single account). When an account with a single login credential is shared by multiple users, a user attempting to log into the account may not have access to the device or account that receives the OTP from the system. In these cases, the user attempting to login may then have to contact the individual who receives the OTP in order for the system to allow login for the user as a trusted individual. This creates unnecessary problems with timing, coordination, and, in the event of a business enterprise, potentially wasted economic opportunity.

Thus, there is a need in the art for solutions that enable the sharing of an OTP with multiple users of an account with a single login credential.

SUMMARY OF THE INVENTION

This section provides a general summary of the disclosure and is not a comprehensive disclosure of its full scope or all of its features.

A system, method, and other aspects for distributing multifactor authentication data to trusted parties via a software application are described. The system can generate or assign a system phone number to a primary login account user. A group can be created within the software application, and the primary user and the system phone number can be associated with the group and stored in memory. The primary user can input, and the system can receive, contact information for one or more additional trusted parties who can be added to the group. The system can then send invitations to the trusted parties using the received contact information. The invitations can include links, means, and/or instructions to join the group. When the primary user or any of the trusted users attempts to access the account, the two-factor/multifactor authentication information (for example, a code, a link, a OTP, and/or the like) is sent to the system phone number via short message service (SMS) or multimedia messaging service (MMS) and is accessible to the primary user and to the other users through the software application (for example, via SMS or push notification from the system to the devices that have the software application installed and notifications allowed), allowing the primary user and the other users to use the OTP to access the account. The two-factor/multifactor authentication information can be time-based, autogenerated (for example, time-based authentication codes or tokens), multiple types of authentication information combined, and/or the like.

According to one or more aspects, the group can be associated with an email account. The email account can be a system email account. The system email account can receive two-factor/multifactor authentication information (e.g., OTPs) and include functionality to send or forward the two-factor/multifactor authentication information to the primary user and trusted parties via email, SMS, MMS, push notification, and/or the like, in some instances with user interaction with the software application.

According to one or more aspects, the group is associated with a token. The token can be a hardware or software token.

According to one or more aspects, a group member must confirm or designate themselves to receive an OTP message, create an access trace, whereby other group members may be prevented from or otherwise not receive access using the OTP.

According to one or more aspects, a group member can be a third-party application that is operable to make an authorized request for an OTP through a system API.

BRIEF DESCRIPTION OF THE DRAWINGS

A more complete understanding of these embodiments, and the attendant advantages and features thereof, will be more readily understood by reference to the following detailed description when considered in conjunction with the accompanying drawings. The drawings described herein may not be to scale, are for illustrative purposes only of selected embodiments and not all possible implementations and are not intended to limit the scope of the present disclosure.

For clarity and in order to emphasize certain features, not all of the drawings depict all of the features that might be included with the depicted embodiment. The innovation herein also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

Corresponding reference numerals generally indicate corresponding parts throughout.

DETAILED DESCRIPTION

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

As used herein, relational terms, such as "first" and "second," "top" and "bottom," "forward" and "rearward," and the like, may be used solely to distinguish one entity or element from another entity or element without necessarily requiring or implying any physical or logical relationship or order between such entities or elements.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In describing preferred and alternate embodiments of the technology described herein, specific terminology is employed for the sake of clarity. The technology described herein, however, is not intended to be limited to the specific terminology so selected, and it is to be understood that each specific element includes all technical equivalents that operate in a similar manner to accomplish similar functions.

Example embodiments will now be described more fully with reference to the accompanying drawings. Specific details are set forth such as examples of specific components and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known device structures are not described in detail.

Systems that require or are configured to use second-factor authentication or multifactor authentication (for simplicity, referred to as 2FA) will generally send a one-time passcode (OTP) via SMS to a phone number associated with the account being accessed. When a non-registered account user attempts to log in to an account requiring 2FA (for example, entertainment platform accounts, work platform accounts, bank system account, and/or the like), the non-registered user will not receive the SMS with the OTP. For example, if spouses share an account requiring 2FA wherein the first spouse is the registered user and the first spouse's phone number is the registered phone number, when the second spouse attempts to log in, the first spouse receives the SMS with the OTP instead of the second spouse. Aspects of the computing systems and/or the application platforms described herein address this issue by creating a system phone number to be used for registration and forwarding the SMS received at the system phone number to the phone numbers of the members of a group associated with the phone number.

Figure 1:
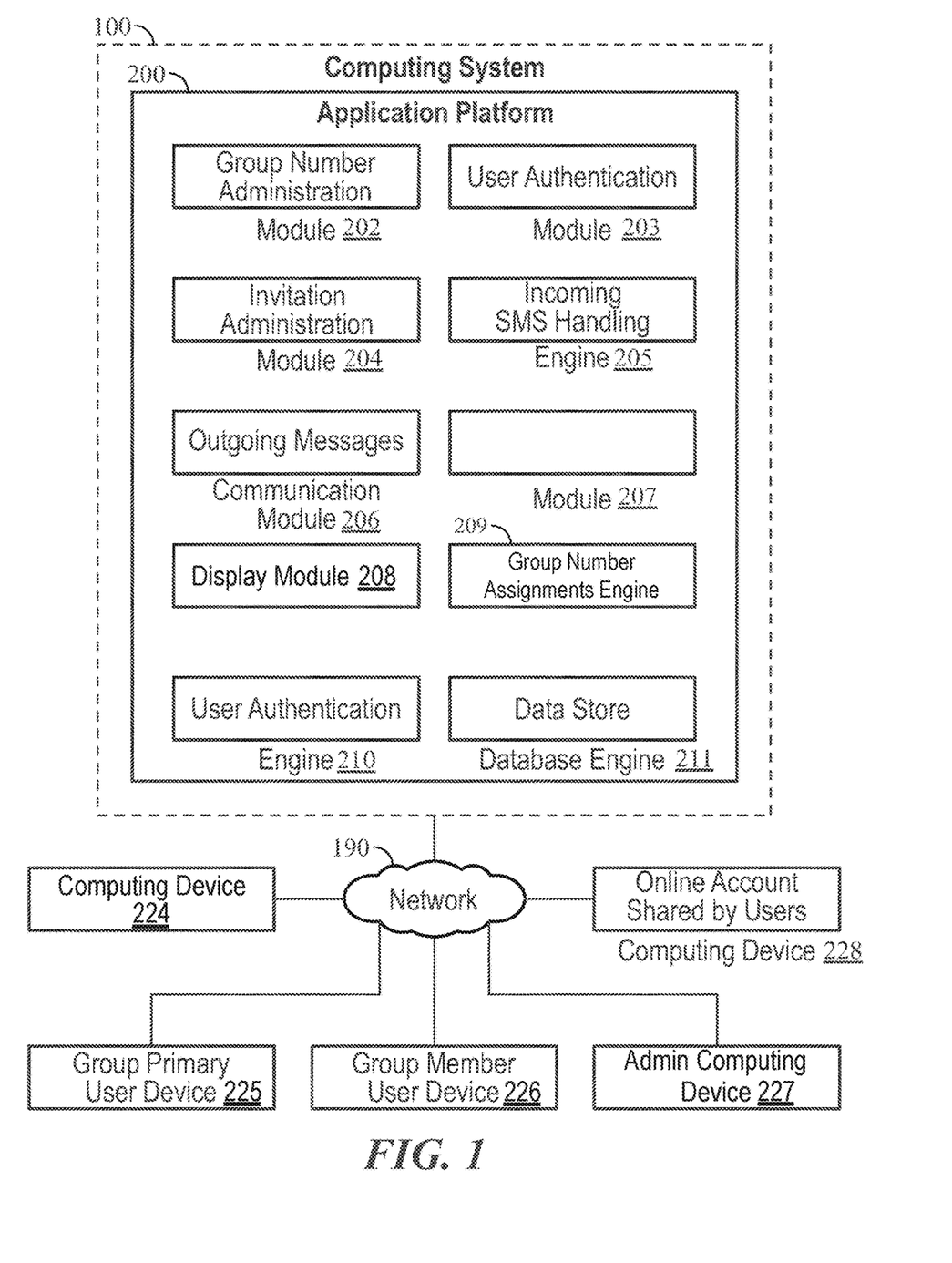
FIG. 1 is a block diagram of a computing system and an application platform for distributing multifactor authentication data, according to one or more embodiments.

FIG. 1 illustrates a block diagram of a computing system 100 and an application platform 200 for distributing multifactor authentication data. The computing system 100 can be any type of computer or computer system, such as one or more servers and/or computers. The computing system has a processor, which may be either or both a general and a special purpose microprocessors and/or any one or more processors of any digital computing device. The processor(s) executes the application platform 200. The application platform 200 resides in memory of the computing system 100 and has a group number administration module 202, a phone verification module 203, an invitation administration module 204, an incoming SMS handling engine 205, an outgoing messages communication module 206, a display module 208, a group number assignments engine 209, a user authentication engine 210, and a database engine 211. The computing system is communicatively coupled to a network 190. A computing device 224, a group primary user device 225, a group member user device 226, and administrator computing device 227, and a shared online account hosting computing device 228 are each communicatively coupled to the network 190. The group primary user device 225 and the group member user device 226 have an application that corresponds and communicates with the application platform 200.

The group number administration module 202 has instructions that, when executed by the processor, cause the computing system 100 to generate or request a system phone number. The system phone number can be a type of or part of an authentication receiver or associated therewith. Authentication receivers are hardware, software, and/or any component(s) that are or can be configured to receive authentication information. Generally, phone numbers can be used to receive voice calls and messages (SMS and MMS). A phone number can be associated with an authentication receiver (e.g., device) when it receives a call, SMS, and/or MMS that contains authentication information. Authentication information is any OTP, code, token, link, password, and/or the like that is used to implement second factor authentication (2FA) or multifactor authentication (MFA). While using 2FA for simplicity, whenever referring to 2FA herein, 2FA should be interpreted as contemplating MFA, and that "2FA" is not necessarily limited to two factors for authentication.

The computing system 100 and the application platform 200 may be integrated with telephonic systems such that the group number administration module 202 generates system phone numbers. According to one or more aspects, the computing system 100 and the application platform 200 may be communicatively coupled with telephonic systems such that the group number administration module 202 requests and/or obtains system phone numbers from the telephonic system.

The phone verification module 203 has instructions that, when executed by the processor, cause the computing system 100 to verify the phone number of any user by sending authentication information to the phone number being verified. The user of the device with the phone number being verified receives the authentication information and submits it back to the phone verification module 203 through the computing system 100. For example, if the authentication information is a time-based OTP, the user inputs the OTP into a web portal, made available by the computing system 100 and the application platform 200 through the network 190, within the allotted time frame to obtain user access to the application platform 200. If the authentication information is an internet link pointing to a webpage made available by the computing system 100 and the application platform 200 through the network 190, the user clicks or opens the link to reach the webpage and obtains user access to the application platform 200.

The invitation administration module 204 has instructions that, when executed by the processor, cause the computing system 100 to generate and send invitations to trusted users. Trusted users that accept invitations become group members.

According to one or more aspects, one or more computing devices, such as computing devices 224, 225, 226, 227, and/or 228, incorporate part and/or all of the features and characteristics of the computing device 100. An administrator of the computing system 100 and/or the application platform 200, via the administrator computing device 227. This allows the administrator to block access to individuals that are known and/or have a history of improper conduct regarding the use of electronic platforms and systems. According to one or more aspects, the administrator, via the administrator computing device 227, the computing system 100, and/or the application platform 200, turns on and/or turns off (meaning enables and/or disables the operation of) the SMS forwarding, push notifications, messaging via the application, 2FA, MFA, and/or any modules, engines, functions, and/or features of the application platform 200 for a user, a particular user phone, a particular group, a particular set of users, a particular set of users in a group, a particular set of groups, a particular application instance, a particular shared online account, a particular shared online account host or service, one or more IP addresses, parts or modules of the application platform 200, a particular version of the application (including when users using old versions connect or attempt to connect with the computing device 100 and/or the rest of the application platform 200), and/or the like.

The incoming SMS handling engine 205 has instructions that, when executed by the processor, cause the computing system 100 to receive the SMS and determine whether the SMS contains authentication information from a user (for example, responding to an invitation or verifying their phone with the application 200) or from a shared online account hosting computing device 228. If the incoming SMS has authentication information from a user, the message source (for example, the phone number of the user) and the authentication information are matched to a phone verification (module 203), a group invitation (module 204), or an incoming SMS or authentication information from a shared online account (engine 205). If the incoming SMS has authentication information from a shared online account computing device 228, the incoming SMS handling engine 205 determines the group to which the authentication information corresponds and determines whether to forward the authentication information to all members of the group or whether to forward the authentication information to a particular member of the group based on prior selection by that particular member. According to one or more aspects, if the incoming SMS has authentication information from a shared online account computing device 228, the incoming SMS handling engine 205 determines the group to which the authentication information corresponds and determines whether to forward the authentication information to all members of the group, to a subset of the group members, or to a particular member based on prior selection by the primary member, an authorized member, and/or the particular member. The primary member (and other members when authorized) may control how authentication information is handled and forwarded by the application platform 200 and whether to grant members authority to control the forwarding aspects or other aspects of the application platform 200.

Prior selection of members for forwarding incoming SMS with authentication information is configured via forwarding rules stored in memory. Through the application platform 200, the primary users and/or members select and set and change a one-time, a temporary, and/or a permanent forwarding rule. If no rule is set, each member of the group can receive any incoming that has authentication information from a shared online account computing device 228. The SMS handling engine 205 stores the forwarding rules. According to one or more aspects, the incoming messages database 260 and/or any of the other databases of and/or accessible to the application platform 200 store the forwarding rules. According to one or more aspects, for the application of a forwarding rule, a member inputs to the application platform 200 a selection (the prior selection discussed above) of one or more members that should receive the expected incoming SMS and the shared online account or accounts associated with the rule. The application platform 200 can programmatically monitor the web browsing and/or application use of the members (whether the application use is on a smartphone, tablet, laptop, desktop, smart watch, and/or the like). The programmatic monitoring enables automatic detection of attempts to log into a shared online account. When an attempt to log in is automatically detected, the incoming SMS handling engine 205 (and/or any other component of the computing system 100 and/or the application platform 200) associates the attempt to log in with the member account associated with the member performing the attempt and/or to the device being used to do the attempt based on a triggering of an automatic detection of the attempt. The incoming SMS handling engine 205 (and/or any other component of the computing system 100 and/or the application platform 200) can determine which forwarding rule applies, if any, based on the forwarding rule that was set by the member determined to be attempting to log in, the member associated with the device on which the automatic detection occurred, the account to which the member is attempting to log in, and/or a default forwarding rule.

The outgoing messages communication module 206 has instructions that, when executed by the processor, cause the computing system 100 to forward authentication information through the network 190 to the various computing devices. The outgoing messages communication module 206 formats and packages the authentication information according to the communication medium that will be used, for example, voice call, SMS, MMS, internet, email, push notification, and/or the like.

Once a primary user or members register their smartphones or other electronic devices to the application platform 200 and are ready to receive forwarded SMS messages from the application platform 200, any such member would still receive SMS messages from the application platform 200 without a client application installed on their smartphones or other electronic device, but, in some embodiments, not push notifications. Push notifications may require a client application to be installed on the device receiving the push notification in some embodiments.

According to one or more aspects, each system phone number is used for one or more shared online accounts. According to one or more aspects, each system phone number is used for only one shared online account. The application platform 200 is configured to detect when more than one shared online account is associated with a system phone number and, based on a determination of the system phone number being associated with more than one shared online account, block forwarding messages from shared online accounts, block forwarding messages from shared online accounts other than the first online account that used the system phone number, and/or notify the primary user and/or one or more members of the group associated with the system phone number that message forwarding is blocked or will be blocked for any of the shared online accounts.

The display module 208 has instructions that, when executed by the processor, cause the computing system 100 to generate information to be displayed, including text, graphics, sounds, video, images, and/or the like, at a screen or interface of the computing system 100, a screen or interface of group primary user device 225 using an application of the computing system 100, and/or a screen or interface of any group member user device 226 using an application of the computing system 100.

The group number assignments engine 209 has instructions that, when executed by the processor, cause the computing system 100 to associate a system phone number to a group.

The user authentication engine 210 has instructions that, when executed by the processor, cause the computing system 100 to compare and match the authentication information from users to that of the users in the various groups. If the user authentication engine 210 determines that there is a match, the users is allowed to access the application platform according to the authority level of the user.

Figure 2:
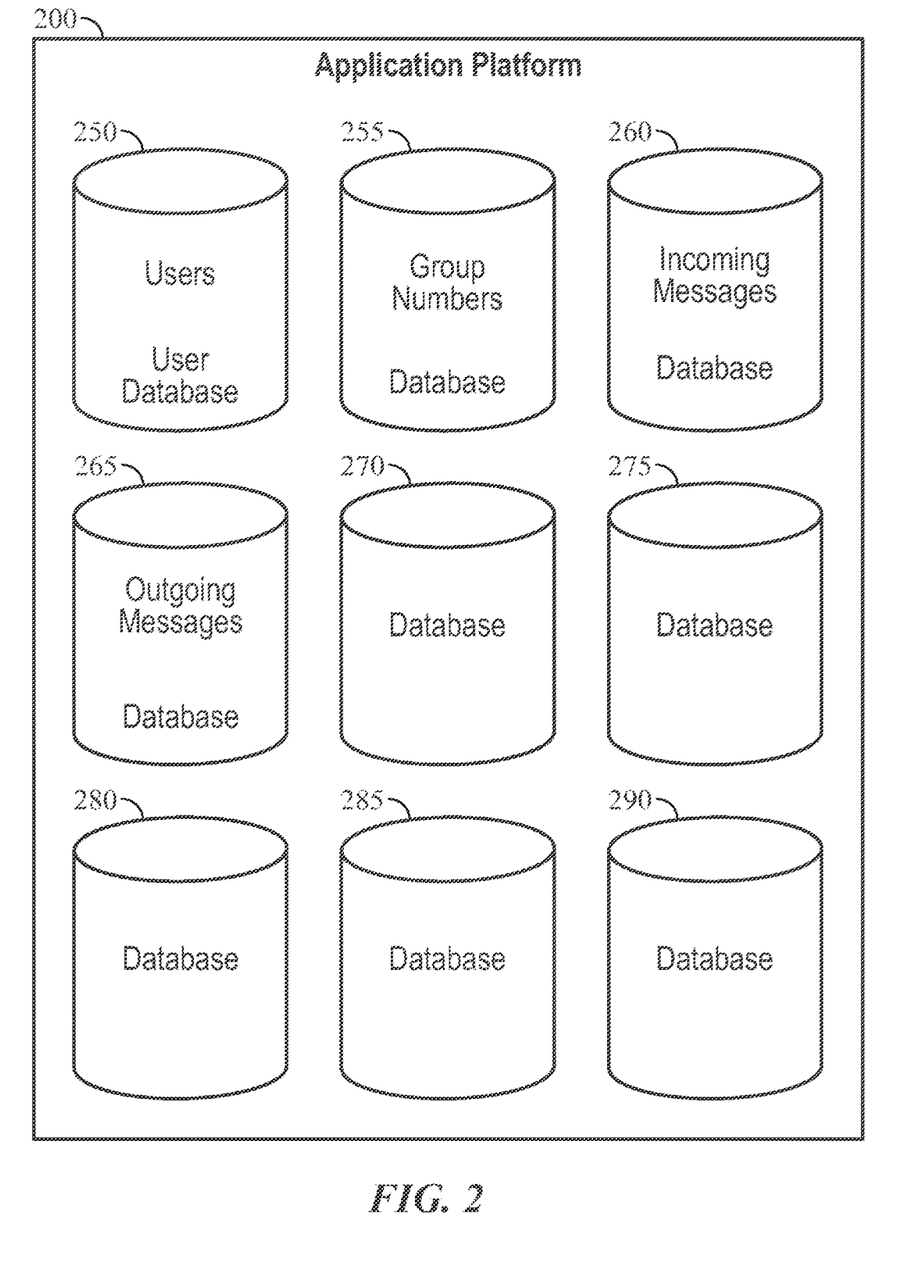
FIG. 2 is a block diagram of databases accessible to the application platform of FIG. 1, according to one or more embodiments.

The database engine 211 has instructions that, when executed by the processor, cause the computing system 100 to communicate with the various databases of the application platform 200, as illustrated and described with respect to FIG. 2.

FIG. 2 illustrates various databases of the application platform 200. Although the various databases appear inside the application platform 200, one or more of the various databases may reside outside the application platform 200, in a different environment or physical memory than the application platform 200, and/or in a separate system accessible to the application platform 200 through the network 190. The database engine 211 may execute instructions that cause the computing system to send and receive information to, and to send commands to and to receive results of commands to add, change, and delete information from the various databases. The commands and information sent to or requested from the various databases come from users and/or from other systems. For example, when the computing system 100 receives authorization information form a shared account, such authorization information from another system and is sent to an incoming messages database 260 for storage.

The various databases include a user database 250, a group numbers database 255, the previously mentioned incoming messages database 260, and an outgoing messages database 265.

The user database 250 stores information about the users of the application platform 200, which may include name, email, address, phone number, fax, type of user device of the user including operating system, brand, model, or other information, and any other contact information.

The group numbers database 255 stores information about the phone number to which a group is associated, the members of each group, and the role of each member (whether the member is a primary member or has authority assigned by the primary member).

The incoming messages database 260 stores information about all incoming messages (for example, messages containing authorization information) and the association of each incoming message to which phone number and/or which group.

The outgoing messages database 265 stores information about all outgoing messages, including which incoming messages were forwarded to which groups, and which incoming messages were forwarded to one member or subsets of members of a group.

Example Process(es)

To enable the reader to obtain a clear understanding of the technological concepts described herein, the following process(es) describes specific steps performed in a specific order. However, one or more of the steps of a particular process may be rearranged and/or omitted while remaining within the contemplated scope of the technology disclosed herein. One or more processes and/or steps thereof, may be combined, recombined, rearranged, omitted, or executed in parallel to create different process flows that are within the contemplated scope of the technology disclosed herein. While the process(es) below may omit or briefly summarize some of the details of the technologies disclosed herein for clarity, the details described in the paragraphs above may be combined with the process steps described below to get a more complete and comprehensive understanding of this (these) process(es) and the technologies disclosed herein.

Figure 3:
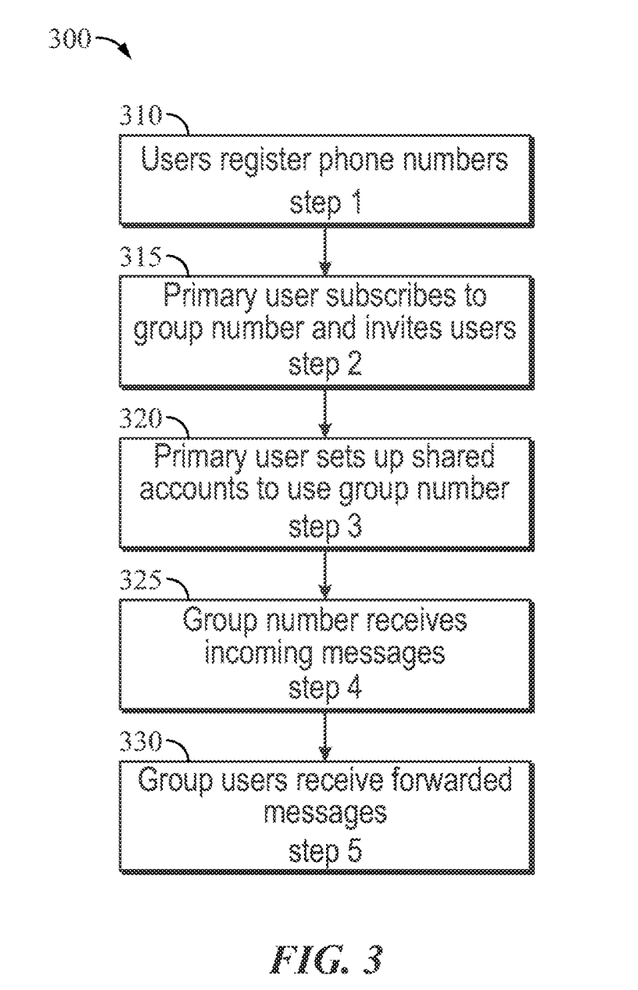
FIG. 3 is a flowchart of a process for distributing multifactor authentication data, according to one or more embodiments.

FIG. 3 illustrates a flow diagram of a process 300 for the operation of a system for distributing multifactor authentication data to trusted parties such as computing system 100, according to one or more aspects. According to one or more aspects, process 300 begins at step 310, in which users register phone numbers. The primary user registers a phone number and registers information about the account to be shared and provides contact information of the trusted parties. Each of the trusted parties that performs Step 1 becomes a member of a group. Note that a member in one group may be or may become a primary user of another group, and vice versa. According to one or more aspects, at Step 1, users register emails or other contact information for receiving authorization information. Next, on step 315, the primary user subscribes to a group phone number and invites trusted users to join the group. If the trusted users are not yet registered as provided in step 310, the computing system sends an invitation to register to the unregistered trusted user. In step 320, the primary user uses the group phone number to set up one or more shared accounts. Next, on step 325, the group number receives incoming messages. In step 330, the messages received at the group number are forwarded to the primary member and/or the members of the group. The primary user and the members can select, through their applications, to limit which users receive the message to be forwarded. According to one or more aspects, the primary user (and/or any member authorized by the primary user) may authorize or limit the ability of other members to change which members will receive which forwarded messages. Spam and unrequested messages may be forwarded and/or filtered according to user preferences. Other messages, such as account status or informative messages related to the shared account may be forwarded or filtered according to user preferences and/or according to the primary user preferences or according to authorized user preferences.

Figure 4A:
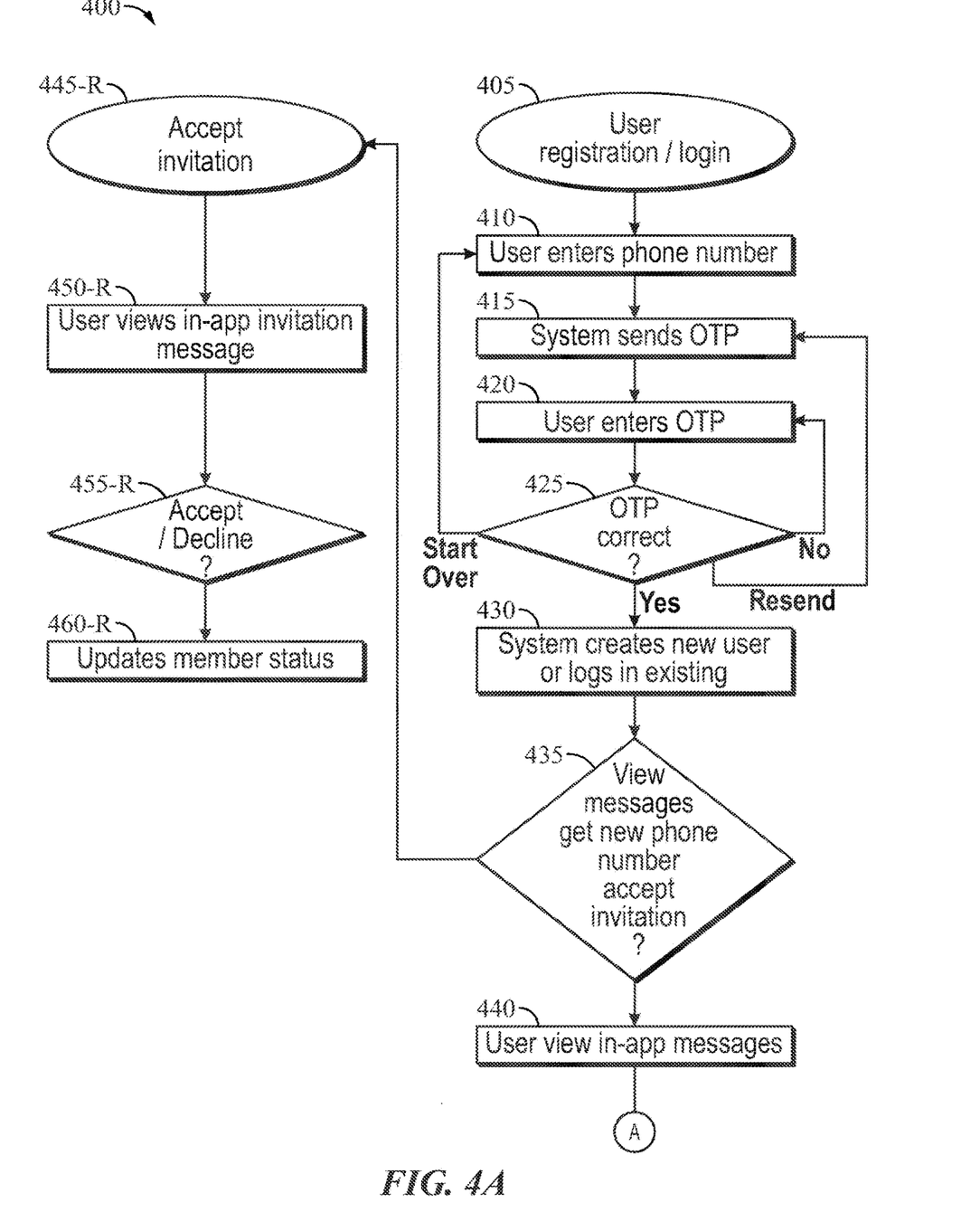
FIGS. 4A-4B are a flowchart of a process for inviting, registering, getting system phone numbers, viewing messages, and distributing multifactor authentication data, according to one or more aspects.
Figure 4B:
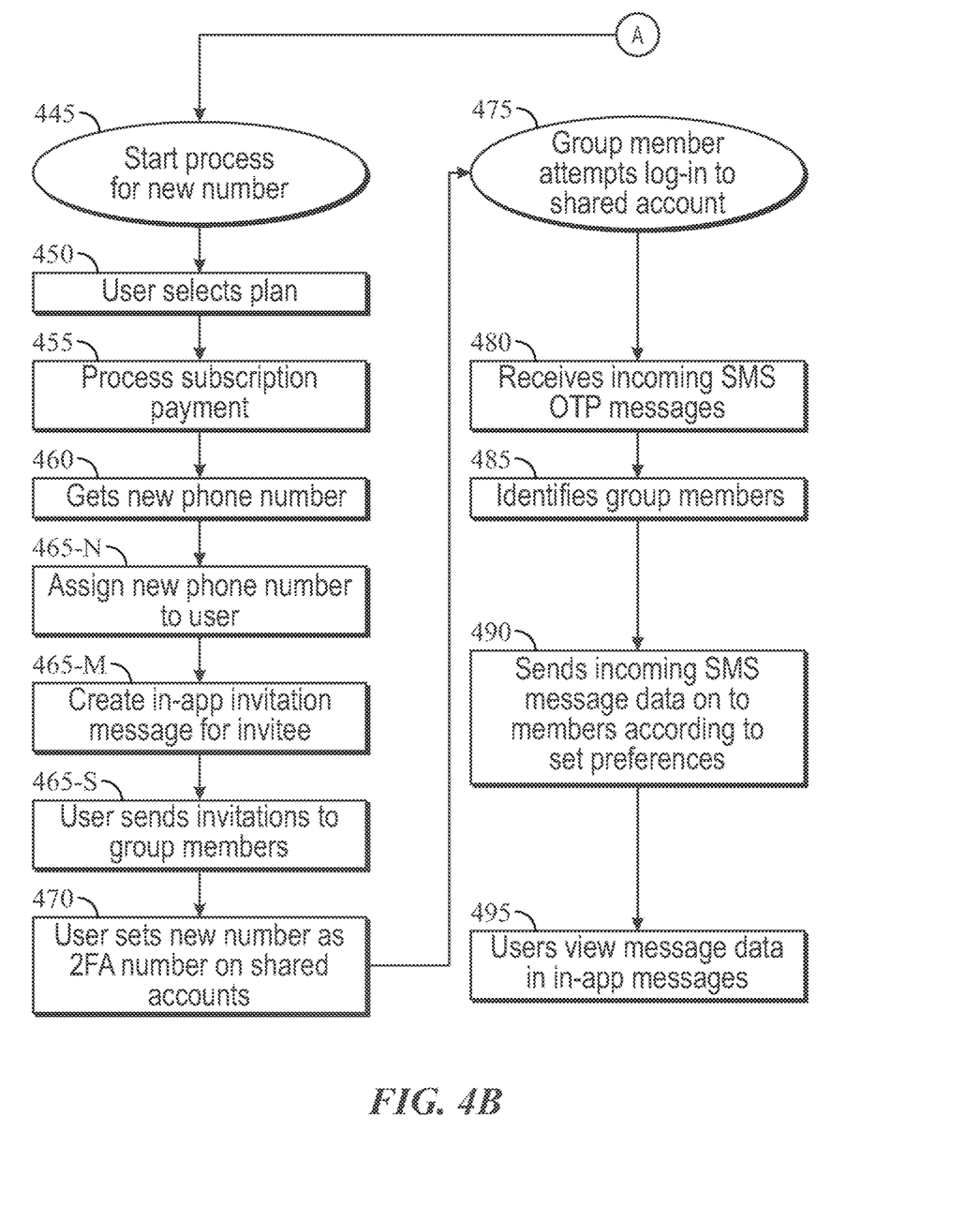

FIGS. 4A-4B illustrate a flowchart of an expanded process 400 for inviting, registering, getting system phone numbers, viewing messages, and distributing multifactor authentication data for the operation of a system for distributing multifactor authentication data to trusted parties such as computing system 100, according to one or more aspects. Process 400 starts at step 405, where a new user registers or logs in to an application such as those available, based on, part of, and/or that implement or are implemented by an application/application platform like the application platform 200. A new registered user that was not invited by any other user (or that registers without going through the aspects of the process provided for invited users) registers without any associations to any group and/or to any system phone numbers. In some embodiments both invited and non-invited users go through the same steps. To register the user, the process moves to step 410, were the user enters the phone number of the smartphone/mobile phone/computing device of the user (note that the user will not necessarily need a physical phone to have a phone number, such as when a user on a tablet or desktop computer enrolls in a digital communication service (e.g. VoIP or video conferencing) and obtains a phone number through that service; however, the user will need to be using the application). In step 415, the system sends an OTP to the phone number of the user, and the user enters the OTP (or 2FA) in the application in step 420. If the user waits and does not receive an OTP in a reasonable amount of time, the user can request a new OTP through the application. Next, on step 425, the application determines whether the OTP is incorrect (the OTP entered by the user does not match the OTP sent to the user), whether the user requested a new OTP, or whether the OTP is correct (the OTP entered by the user matches the OTP sent to the user). If the OTP is incorrect, the application goes back to step 420 and again requests the user to enter the OTP. If the application receives a request to resend the OTP from the user, the application goes back to step 415, generates a new OTP and sends it to the user. According to one or more embodiments, if the application receives a request to resend the OTP from the user, the application resends the same OTP and/or asks, requires, or allows the user to change the method of OTP transmission (for example, for the OTP to be sent by email). If the OTP entered by the user is correct, the application moves on to step 430. In step 430, the application determines whether the user is an existing, registered user or whether the user is a new, unregistered user. If the user is unregistered, the process 400 records in the user database 250 the user as a registered user along with the name, phone number, email, and/or any other contact and/or personal identifiable information, and logs in the new registered user. According to one or more aspects, when a registered user logs in at step 405 with a username, password, and/or an OTP, the application verifies and determines that the user is a registered user based on a user lookup in a user database, such as the user database 250. According to one or more aspects, if the user is verified as a registered user on step 405, the application immediately moves on to step 430 and logs in the user. When the registered user is logged in, or when the unregistered user has verified the user's phone number with the OTP at step 425 and has been recorded in the user database, the application moves on to step 435.

In step 435, the user determines what path of process 400 to choose based on whether there are any pending invitations for the user to join a group. If the user that received and/or is responding to an invitation to join a group, the process 400 moves to the accept invitation path at step 445-R. Otherwise, the process 400 moves to step 440, where the process 400 causes the display on screen of messages, if any, that the application has received for that user on the screen of the user's computing device.

In step 445-R, the user starts the path to accept or decline an invitation to join a group, moving on to step 450-R. In step 450-R, the application displays on screen the invitation message to the user and buttons for the user to input the decision of the user to accept or decline the invitation. When the user inputs the decision, the application receives the user input and the process 400 moves to step 455-R, where the application determines, based on the input, whether the user chose to accept or to decline the invitation. With the knowledge of the user's choice, the process 400 moves to step 460-R. If the user chose to decline the invitation, the application records the decision and the process 400 moves back to step 435, so as to handle other pending invitations, if any, or move from step 435 to step 440, as discussed above. If the user chose to accept the invitation, the application records the decision, add the user as a member of the group to which the user was invited in a group database, such as group database 255, and the process 400 moves back to step 435, so as to handle other pending invitations, if any, or move from step 435 to step 440, as discussed above.

In step 440, the user can read messages, perform the available functions as primary user or member of any group as discussed above, or leave the application. The user may also choose to start a process for a new number, the process 400 moving to step 445, or send invitations to new non-members to join an existing group of which the user is a primary user (or authorized member), the process 400 moving to step 465-S.

In step 445, the user starts the path to obtain a system phone number, moving on to step 450. In step 450, the user selects a plan. In step 455, the user inputs payment information, such as credit or debit card (and name on card and CID and/or security number on card), billing address, bank account information (ACH, e-check, and/or the like), crypto-wallet, third-party payment service information (such as PayPal®, Venmo®, Apple Pay®, Google Pay®, and/or the like and purchases through digital storefront(s)), and/or the like. Then, process 400 processes the subscription payment. If payment is not successful, the user gets to input any missing information, try to make payment again, and/or change the payment information. If the payment is successful, the process 400 moves to step 460, where the system obtains a system phone number. Then, in step 465-N, the process 400 associates the system phone number to the user as primary user to a new group and saves the information and associations in the user and/or group number databases. Each plan includes, accepts, and/or requires one or more parameters that affect the operation of the application. It will be apparent to those skilled in the art that some of the parameters are selected and/or defined before and other parameters after processing subscription payment and enrolling the user in the plan. For example, pricing of plans is defined by the application before plan selection and subscription payment, payment information is provided by the user after plan selection but before subscription payment, and invitation information (names, emails, phone numbers, and other information as discussed above for the invitation path at step 445-R) is provided by the user after subscription, payment, and system phone number generation.

The parameters include any of the following: if group members are allowed to receive SMS messages, the type of plan, the primary user, maximum number of invited members in the group, the invited users, the group and the members of the group, the phone numbers of the primary user and of the members, maximum number of shared account associations, the shared account associations to the system phone number of the group, the system phone number association to the group and/or the plan, the group associated to the plan, the maximum number of incoming and/or outgoing SMS messages per month (or different time period), minutes or time per month (or different time period) of incoming voice calls to the system phone number routed to the primary user and/or a member and/or another phone number, subscription and payment information, plan pricing, and/or the like.

After assigning the system phone number to the user, the process 400 moves to step 465-M, where the application displays on screen to the user a form or interface that the user, as the primary user of the group (and any authorized member) may create invitation messages for other registered or non-registered users to become members of the group by inserting the corresponding parameters, such as names, phone numbers, emails of users to be invited, and/or a generic invitation message or a personalized message. In step 465-S, the user inputs a command to send invitations, and the application causes the system to send invitations to the invitees based on the parameters inserted by the user for the invitations in step 465-M. In step 470, the user sets the system phone number as the 2FA/OTP number on one or more shared online accounts. At this point, the new number is ready for use and the process can move on to the new number use/shared account log-in attempt path of step 475.

In step 475, the primary user and/or any member attempts to log in a shared online account that is set with the system phone number. Note that this occurs outside of the application. The primary user and the members do not need to be logged-in into the application as in step 405. After the attempt of step 475, in step 480 the system of the shared online account, such as computing device 228, sends an OTP to the system phone number and the system phone number receives the OTP. Next, in step 485, the application identifies the group members associated to the system phone number. Then, in step 490, the process 400 forwards the received OTP to one or more members (which may or may not include the primary user) based on the list of group members, the members phone number and/or any forwarding information, and/or any set preferences, such as selected forwarding limitations recorded in the user and group databases (for example, a member selecting to limit the forwarding to that member only, and other possible preferences and limitations as discussed above). After the OTP is forwarded, the corresponding user(s) receive the OTP and/or the user is notified of a received OTP via SMS, push notification, email, and/or any other forwarding medium as selected or specified by that user, and the user may view the OTP message in the messages section of the application, as discussed above for step 440.

Back in step 440, if a user has no invitations and is not a member of any group, the user does not have and will not have any messages (in some embodiments a welcome message from the application can be displayed). According to one or more aspects, the application automatically takes logged-in users that have no invitations and are not members of any group to the path for obtaining a system phone number in step 445.

In the description of the various aspects above, it will be apparent to those with ordinary skill in the art that SMS messages may be combined and/or substituted with each other and/or combined or substituted with email notifications, push notifications, MMS, and/or other public and/or proprietary communication mediums and/or protocols (such as Skype WhatsApp Facebook Messenger®, and/or the like) when technologically feasible. Likewise, email notifications, push notifications, MIMS, and/or other public and/or proprietary communication mediums and/or protocols (such as Skype WhatsApp Facebook Messenger®, and/or the like), when technologically feasible, may be combined and/or substituted with each other and/or with SMS messages. Thus, email notifications, push notifications, MIMS, and/or other public and/or proprietary communication mediums and/or protocols (such as Skype WhatsApp Facebook Messenger®, and/or the like) may be integrated into the application platform 200.

According to one or more aspects, system phone number generation, message transmission, the incoming SMS handling engine 205, and/or the communication module 206 do not involve and/or do not use SIM card technology nor any other technologies susceptible or vulnerable to spoofing. According to one or more aspects, system phone number generation, message transmission, the incoming SMS handling engine 205, and/or the communication module 206 do not involve and/or do not use TDMA and/or GSM technologies nor any other technologies susceptible or vulnerable to spoofing. According to one or more aspects, system phone number generation, message transmission, the incoming SMS handling engine 205, and/or the communication module 206 involve and/or use the communication technologies most secure and least susceptible or vulnerable to spoofing and/or cyberattacks (for example, using CDMA over TDMA and/or GSM, using SHA 256 over SHA 128), including any future technologies that may develop.

One of skill in the art will understand that shapes, sizes, quantities, functions, desired parameters, states, actual parameters, operational parameters, and placement of and spatial relation between different elements and components, and the like—as well as the electronics within and connecting the components described—may be altered and still meet the functionality of the present innovation, even if certain changes increase or reduce cost or utilize technology other than that expressed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for sharing authentication information, the system comprising:
   a server configured to receive authentication information; one or more databases configured to store users, groups, user associations to groups, incoming authentication information, and outgoing authentication information; a memory storing an application; and a processor which executes the application to cause the system to:
   receive registrations from the users, the users including a primary user and trusted users;
   subscribe a primary user to a group;
   associate the group with an authentication receiver, the authentication receiver comprising a system phone number generated by the system and uniquely associated with the group for receiving multifactor authentication messages;
   send invitations to trusted users to join the group;

receive authentication information through the authentication receiver, the authentication information comprising a one-time password (OTP) or other multifactor authentication code transmitted via short message service (SMS), multimedia messaging service (MMS), or push notification to the system phone number; and send the authentication information to at least one of the users, wherein the forwarding is based on stored group associations linking the system phone number to the primary user and trusted users.

2. The system of claim 1, wherein the authentication receiver is a phone number, an email account, a code generator, or a time-based code generator.

3. The system of claim 1, wherein the authentication receiver is a phone number, and wherein the system sends the authentication information to at least one of the users through a text message, an email, or a push notification.

4. The system of claim 1, wherein the user enters a phone number, and the system sends one-time password (OTP) to be verified by the user.

5. The system of claim 4, wherein the system creates a new user or logs in as an existing user.

6. The system of claim 5, wherein the user views and selects at least one plan.

7. The system of claim 6, wherein a subscription payment is processed.

8. The system of claim 7, wherein the system assigns a new phone number to the user.

9. The system of claim 8, wherein the system created an in-app invitation message for an invitee.

10. The system of claim 9, wherein the user sends one or more invitations to at least one group member to permit the at least one group member receives and views message data in an in-app messaging interface.

11. A method for sharing authentication information, the method comprising the steps of receiving, via a server, a plurality of authentication information; storing, via one or more databases, users, groups, user associations to groups, incoming authentication information, and outgoing authentication information; storing, via a memory, an application; and executing, via a processor, the application to cause the system to:

receive registrations from the users, the users including a primary user and trusted users;

subscribe a primary user to a group;

associate the group with an authentication receiver, the authentication receiver comprising a system phone number generated by the system and uniquely associated with the group for receiving multifactor authentication messages;

send invitations to trusted users to join the group;

receive authentication information through the authentication receiver, the authentication information comprising a one-time password (OTP) or other multifactor authentication code transmitted via short message service (SMS), multimedia messaging service (MMS), or push notification to the system phone number; and send the authentication information to at least one of the users, wherein the forwarding is based on stored group associations linking the system phone number to the primary user and trusted users.

12. The method of claim 11, wherein the authentication receiver is a phone number, an email account, a code generator, or a time-based code generator.

13. The method of claim 12, wherein the authentication receiver is a phone number, and wherein the system sends the authentication information to at least one of the users through a text message, an email, or a push notification.

14. The method of claim 13, wherein the user enters a phone number, and the system sends one-time password (OTP) to be verified by the user.

15. The method of claim 14, wherein the system creates a new user or logs in as an existing user.

16. The method of claim 15, wherein the user views and selects at least one plan.

17. The method of claim 16, wherein a subscription payment is processed.

18. The method of claim 17, wherein the system assigns a new phone number to the user.

19. The method of claim 18, wherein the system created an in-app invitation message for an invitee.

20. The method of claim 19, wherein the user sends one or more invitations to at least one group member to permit the at least one group member receives and views message data in an in-app messaging interface.

* * * * *